July 7, 1925.
H. A. BARSCHOW
AUTOMATIC THERMOSTAT CONTROL FOR OVENS
Original Filed Jan. 10, 1923
1,544,880
2 Sheets-Sheet 1
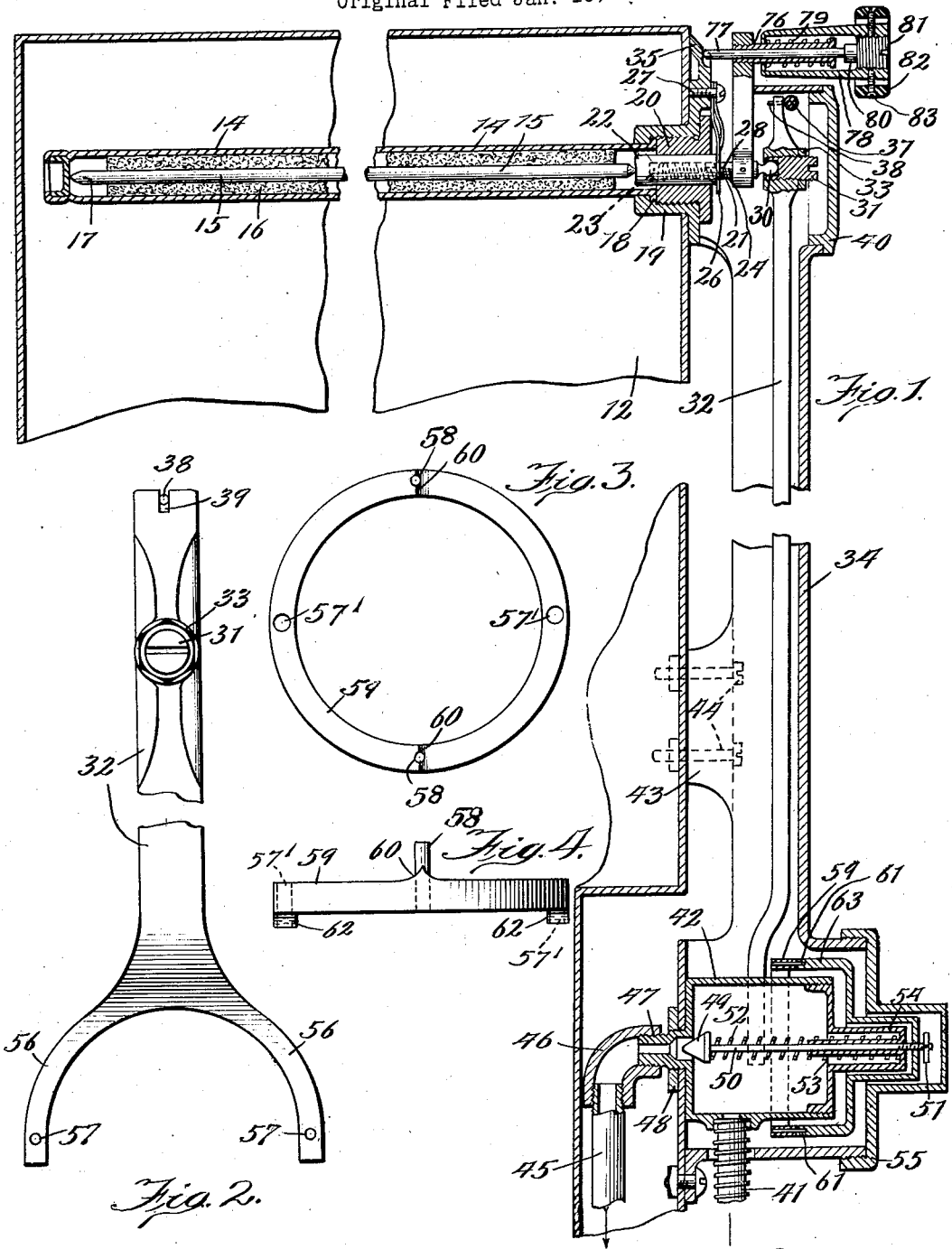

July 7, 1925. 1,544,880
H. A. BARSCHOW
AUTOMATIC THERMOSTAT CONTROL FOR OVENS
Original Filed Jan. 10, 1923 2 Sheets-Sheet 2

Inventor:
Hubert A. Barschow,
By Mason, Fenwick & Lawrence
Attys.

Patented July 7, 1925.

1,544,880

UNITED STATES PATENT OFFICE.

HUBERT A. BARSCHOW, OF CHICAGO, ILLINOIS, ASSIGNOR TO RUDOLPH HOFFMAN, OF CLEVELAND, OHIO.

AUTOMATIC THERMOSTAT CONTROL FOR OVENS.

Application filed January 10, 1923, Serial No. 611,881. Renewed May 29, 1925.

*To all whom it may concern:*

Be it known that I, HUBERT A. BARSCHOW, a citizen of the United States, residing at 2928 Washington Boulevard, Chicago, in the county of Cook and State of Illinois, have invented certain new and useful Improvements in Automatic Thermostat Controls for Ovens; and I do hereby declare the following to be a full, clear, and exact description of the invention, such as will enable others skilled in the art to which it appertains to make and use the same.

This invention relates to improvements in an automatic thermostat control for ovens, and has for its principal object the provision of a thermostatic gas regulator for baking ovens, water heaters, or the like, and which is so constructed that a predetermined temperature can be attained and automatically maintained by the use of this device.

This application constitutes a companion case on a somewhat similar construction covered in applicant's prior application for United States Letters Patent, filed August 22, 1922, Serial No. 583,662.

One of the important features of this present invention relates to the provision of an automatic thermostat control for ovens provided with means whereby, when the same is set at any desired temperature, it will be positively maintained at such point regardless of any outside forces, or even of any inside forces which might operate by expansion or contraction to shift the temperature regulating mechanism.

Another and further important object of the present invention is the provision in an automatic thermostat control for ovens of a valve mechanism directly operated on by a thermostatically controlled lever, which valve mechanism shall be particularly simple of construction, and positive in operation, also, not likely to get out of order.

Still another important object of the invention is the provision of an automatic control for ovens regulated by a thermostatic element whereby any predetermined temperature can be attained and maintained within a very close range by a regulation of the fuel supply.

Other and further important objects of the invention will be apparent from the disclosures in the accompanying drawings and following specification.

The invention, in a preferred form, is illustrated in the drawings and hereinafter more fully described.

In the drawings:

Figure 1 is a vertical section of the improved device of this invention, showing practically all the working parts thereof.

Figure 2 is a perspective view of the thermostatically controlled lever which operates the fuel valve.

Figure 3 is a plan view of the ring element, whereby a freely moving four point suspension is attained between the operating lever and the valve housing.

Figure 4 is a side elevation of the ring element, shown in Figure 3.

As shown in the drawings:

Figure 5:
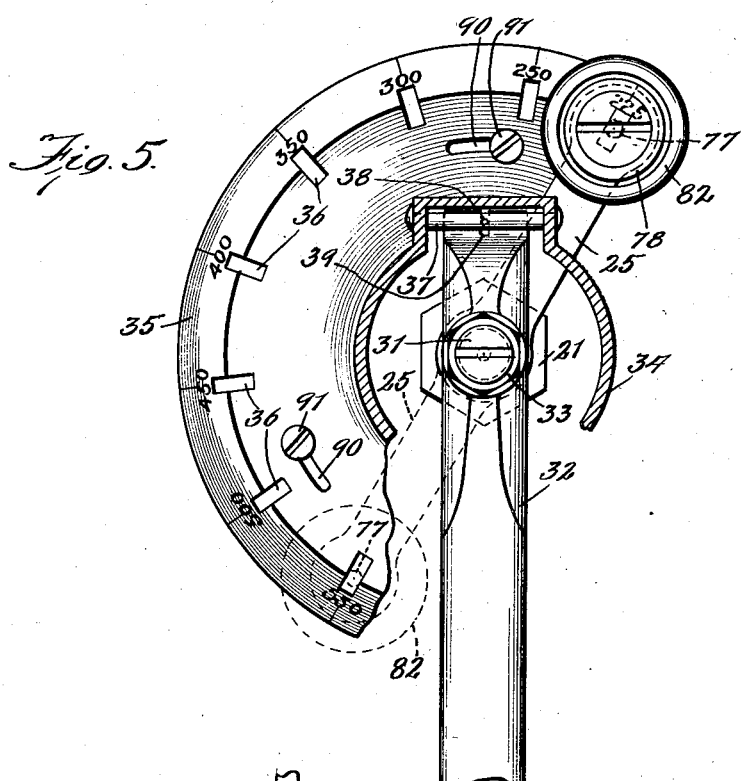
Figure 5 is an elevation showing the dial and its component parts, portions being broken away.

The reference numeral 12 indicates generally an oven or other heating means, the temperature of which can be predetermined and automatically controlled by the improved device of this invention.

This device consists primarily of a thermostat element comprising a tube 14, of copper or other readily expandible metal, which extends into the oven and preferably across the width thereof. Extending axially through the copper tube 14 is a rod of porcelain or other suitable material 15, maintained in position by means of packing or the like, 16. One end of the rod, as at 17, is maintained against the closed end of the copper tube 14 by the action of leaf springs 26 on the other end of the rod so that as the tube is expanded longitudinally by heat, the porcelain or non-expandible element 15 will be drawn back therewith.

The other end of the tube 14 is flanged, as shown at 18, and is fitted into a cylindrical boss 19, which extends inwardly into the oven through an opening in the side thereof. This boss 19 forms a part of the frame of the thermostat device. The inner face of the boss 19 is screw-threaded, and adapted to be fitted thereinto and against the flange 18 is a suitable retaining plug 20, having an integral hexagonal nut face 21.

The plug 20 is bored axially to form a cylindrical opening adapted to permit of the slidable fit therein of a pin or the like 22, which pin has one end adapted to abut against the free end of the thermostat rod 15. The pin 22 is partially hollowed out from the other end, and this hollowed out portion is screw-threaded, as shown at 23, and has mounted therein the correspondingly screw-threaded end of a horizontally extending bolt or pin 24, which shall, for purposes of convenient description, be designated as the lever supporting element. On the lever supporting element 24 is fixedly mounted a handle member 25 by means of which the lever supporting element can be rotated through approximately 180°, and thereby the extent of its screw-threaded relation with the inner face of the hollow pin 22 is accurately regulated.

Firmly mounted in a screw-threaded opening in the handle member 25 is a hollow bolt 76, which has passing therethrough a pin 77. A handle member 78 is slidably mounted upon the hollow bolt 76, and a helical spring 79 is positioned in the space between the hollow bolt 76 and the handle member 78, as best illustrated in Figure 1. The end of the slidable pin 77 is provided with a flanged head 80, against which head a screw-threaded plug 81 is adapted to abut, the screw-threaded plug 81 being fitted into the open end of the hollow handle member 78, as shown.

The entire handle is preferably composed of metal, and a ring 82, composed of fiber or other material which will not conduct heat, is fitted around the end of the handles and attached thereto, but spaced therefrom by means of screws or the like, 83.

The hollow plug 22 is maintained in contact with the end of the porcelain rod 15 at all times by means of a leaf spring 26 acting upon the outer end thereof, and maintained in cooperative relation therewith by means of screws or the like, 27. The plug 22 is likewise provided with a pair of pins 28, which project therefrom, and enter into corresponding openings in the spring 26, so that said plug 22 is held against rotation with respect to the retaining plug 20.

The free or outer end of the lever supporting member 24 is formed in the shape of a ball or head 30 adapted to enter a corresponding opening in a plug 31, which plug is screw-threaded and fitted into an opening in the thermostatically controlled lever 32 and locked in position thereon by means of a lock nut 33. The plug 31 is slotted in order to allow the insertion of a screw driver for the purpose of adjustment or the like.

The entire apparatus is mounted in a frame 34, and the handle 78 is adapted to be moved over a scale or dial 35 forming part of the frame 34, and which is best illustrated in Figure 5. This dial or scale is graduated into degrees of heat according to the range through which the oven is to be operated, and has imprinted thereon words or numbers at which the pin 77 of the handle 78 may be located according to the temperature which it is desired to maintain. Slots or openings 36 are provided in the scale or dial 35. The pin 77 is adapted to be dropped or spring impelled into any one of these slots 36 by means of the action of the spring 79 in the handle, which will then lock the regulating handle in position at the desired temperature. As here illustrated the operating range of the oven is from 225° F. to 550° F., and the scale is accordingly divided, but it will be obvious that any other degrees of heat may be attained and automatically maintained by this device. As illustrated in Figure 5, two slots 90 are provided in the indicating plate 35, and machine screws 91 pass through these slots and into the backing for the plate. In adjusting the regulator a rough adjustment is first made and then a finer adjustment is accomplished by moving the indicator plate 35 to proper position and then locking the same into place by means of the machine screws 91.

The lever 32 is suspended upon the rounded head 30 of the lever supporting member 24, such mounting or suspension being in the form of a ball and socket joint. A bar 37 extends transversely across the upper end of the frame member 34, and the upper face or end of the lever 32 is flattened, as best shown in Figure 5, and is adapted to bear against the bar 37, which bar forms the fulcrum about which the lever 32 operates. A pin 38 is fitted into the bar 37 and extends horizontally therefrom into a slot 39 formed in the top of the bar 37 by means of which any lateral swinging movement of the lever 32 is effectively prevented. A removable cap 40 is provided at the upper end of the frame 34 by means of which access may be had to the parts just described.

As best shown in Figure 1 the lower end of the thermostat frame is provided with an opening through which extends a flexible gas conducting tube 41, which flexible tube is soldered or otherwise firmly and non-leakably attached to a gas-tight valve housing 42, fixedly positioned in the lower end of the device. The device is adapted to be spaced away from the lower side wall of the oven 12, as indicated in Figure 1, and a lug 43 is integral with the frame 34, said lug having bolts 44 passing therethrough by means of which the device can be securely fixed in position on the oven.

If desired, the apparatus can be positioned directly over the burner of the oven, or preferably as shown in the drawings, is connected directly to a pipe 45 by means of an elbow 46, which pipe carries the regulated gas or fuel to the burner, which may be positioned at any desired part of the oven. This construction provides for a more convenient mixing of the air with the gas than will ordinarily be possible.

A screw-threaded nipple 47 is provided upon the end of the valve housing 42, to which the elbow 46 is adapted to be attached, and this nipple 47 is likewise provided with a screw-threaded shoulder upon which a lock nut 48 is adapted to be fitted, whereby the valve housing 42 may be locked into positive relation with the frame 34. The inner end of the opening through the nipple 47 is fitted up in the form of a valve seat for the reception of a valve member 49, which is fitted upon the end of a rod 50, the rod 50 being screw-threaded at its farther end, and provided with an adjusting nut 51, and further being surrounded by a helical spring 52. The rod 50 is slidably but non-rotatably fitted into a cylindrical opening in an inwardly extending lug 53 forming an integral portion of the valve housing 42.

This lug 53 constitutes a very important part of the device. No packed joint would suffice at this point on account of the different friction that would be on the stem according to various positions or adjustments of the packing nut.

A long, well fitted bearing, such as used in this preferred construction, insures a uniform friction at all times, the length of the bearing, moreover, being such that gas, under ordinary pressure, will not pass through if the stem is properly fitted in the lug 53.

Figure 6:
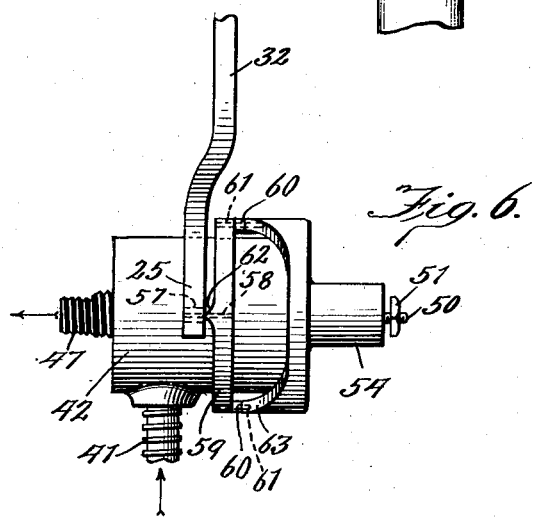
Figure 6 is a vertical elevation showing the relation of the operating lever to the valve housing, and the universal joint connection therebetween.

This lug 53 extends into and forms part of a recessed cylindrical extension of the housing 42, said cylindrical extension being surrounded by a corresponding cylindrical member 54 loosely fitted thereover, as best illustrated by Figures 1 and 6. The free end of the rod 50 extends through an opening in the rear face of the cylindrical housing member 54, and any forward or backward motion of this cylindrical housing 54 will be transmitted to the rod 50 by means of the adjusting nut 51.

A dust-proof cap 55 is fitted over the lower end of the frame member 54, whereby a convenient assembly of the before-mentioned parts may be accomplished.

The lower end of the lever 32 is provided with forked arms 56, the lower ends of said arms 56 being provided with openings 57 adapted for the free reception of pins 58 mounted upon the ring member 59, illustrated in Figures 3 and 4. The pins 58 are fitted into openings centrally mounted with respect to knife edges 60, which knife edges bear against the arms 56, and provide for a free rocking relative motion between the lever arms 56 and the ring member 59.

Positioned on the opposite side of the ring 59, and at points separated 90° from the pins 58 are openings 57' formed in the ring 59, into which loosely fit pins 61 on extensions 63 of the cylindrical housing or cap 54, as best shown in Figure 6, and corresponding knife edges 62 are likewise provided adjacent these pin openings. Thus the long bearing in the lug 53 guides the valve head directly into the valve seat. The flexible joint is not intended to guide the valve, but merely to eliminate any side friction on the valve rod, which side friction would not allow the valve to travel freely, and thereby resulting in poor or in bad regulation.

It will be seen that by the construction herein described a perfectly flexible joint is provided between the lever 32 and the cap or housing 54, and the slidable valve member 49—50 is thereby, at all times, constrained to move in practical conjunction with and to the thermostat lever 32.

The operation is as follows:

Suppose the regulating pin 77 of handle 78 to be set at a low temperature operating position, as shown in the full lines in Figure 5. The pin 77 will then have entered its corresponding slot 36, and the screw-threaded end of the lever supporting pin 22 will then have entered, to quite a considerable degree, or practically to the extent of its movement, into the corresponding screw-threaded opening in the plug 22, thereby allowing the lever 32 to swing forwardly under the action of the spring 52, and permitting said spring 52 to push the valve member 49—50 into a position forward and into the valve seat in the nipple 47, thereby practically shutting off any flow of gas through the valve housing 42, and from the tube 41. The relation between the various parts of the device is previously adjusted, so that at this particular position of the handle 78 just sufficient gas will be allowed to flow through the tube 41 and past the valve 49 to maintain the oven at the lowest temperature on the scale, namely, 225°. If there happens to be a tendency for more gas to flow through the valve opening on account of greater pressure or the like, the resultant excess heat will cause the copper tube 14 to expand, thereby drawing back the non-expansible porcelain rod 15, and allowing the spring 52 to further close the valve, thereby shutting off the excess gas, and cooling the oven.

If the temperature drops too much, owing to a diminished pressure, the tube 14 will contract under cooling, thereby opening the valve slightly, and in this way the temperature of the oven will be maintained at practically the predetermined point.

Now, supposing the handle 78 to be moved to the other extremity of its motion, and the pin 77 dropped into the slot 36 corresponding to the temperature of 550° F.: Evidently this motion will cause the screw-threaded pin 24 to be withdrawn considerably from the socket in the plug 22, thereby pushing the head or ball 30 outwardly in its socket in the plug 31, and swinging the lever 32 outwardly about the pivot point on the bar 37 against the tension of the spring 52, and opening the valve to its fullest extent. This will allow a considerable quantity of gas to flow through the pipe 41 and housing 42, and the oven will be heated up correspondingly. At the same time the thermostat element 14—15 is acting, as explained above, and when the required degree of temperature is attained, the rod 15 will, at that time, be drawn back sufficiently, due to the expansion of the tube 14, to enable the spring 52 to act to slightly close the valve 49, thereby cutting down the flow of gas, and preventing any further rise in temperature.

It will be evident that herein is provided a thermostatic regulator for gas ovens, which is automatically controlled, and wherein all possibilities of accidental movement of the regulating means is prevented, whether arising from external sources, as by brushing against the regulating handle, or whether arising from internal sources, as from a tendency to swing the handle about its pivot point on the lever supporting member, due to longitudinal motion of such lever supporting member induced by the action of the thermostat element. Further, there is hereby provided an adjustment for regulating the flow of gas, which is composed of a minimum of parts, and therefore being extremely simple, is readily and economically manufactured, and is not likely to get out of order. The fact that the rod 50 extends for quite some distance beyond the end of its support or housing 53 will act to automatically seat the valve 49 at all times.

I am aware that many changes may be made and numerous details of construction varied throughout a wide range without departing from the principles of this invention, and I, therefore, do not purpose limiting the patent granted hereon otherwise than as indicated by the prior art.

I claim as my invention:

1. In a thermostatic control device, having a lever controlled valve, the combination of an attachment member, an expansible member carried by the attachment member, a relatively non-expansible member carried by the expansible member, a slide carried by the attachment member adapted to abut the non-expansible member, means for resiliently forcing the slide against the non-expansible member and adjustable means carried by the slide to engage the valve control lever.

2. In a thermostatic control device having a lever controlled valve, the combination of an attachment member, an expansible member, a relatively non-expansible member, a non-rotatable slide having a threaded bore carried by the attachment member, means for resiliently forcing the slide into abutment with the non-expansible member and means for adjustably connecting the slide with the valve control lever, comprising a threaded member adapted to be screwed into or out of the threaded bore of the slide and having a bearing to engage the lever and means for rotating said threaded member with respect to the slide.

3. In combination with an oven, a thermostatic element in the oven, a lever pivoted on the outside of the oven, and adapted to be operated on by said thermostatic element, a gas burner communication extending into the oven, a valve for the gas communication, said valve including a relatively fixed nozzle, a slidable element on the nozzle, and a universal joint connection between said slidable element and the lower end of the pivoted lever.

4. In combination with an oven, a thermostatic element therein, a pivoted lever on the outside of the oven, and adapted to be moved by said thermostatic element, a gas burner communication extending into the oven, and a regulator for the gas communication, said regulator including a relatively fixed valve housing, a valve seat in said housing, a slidable element on the housing, a valve member adapted to cooperate with said valve seat and movable with said slidable element, the slidable element being spring-impelled into operative relation with the lower end of the thermostatically controlled lever.

5. In combination with an oven, a thermostatic element therein, a pivoted lever on the outside of the oven, and adapted to be moved by said thermostatic element, a gas burner communication extending into the oven, and a regulator for the gas communication, said regulator including a relatively fixed valve housing, a valve seat in said housing, a slidable element on the housing, a valve member adapted to cooperate with said valve seat and movable with said slidable element, the slidable element being spring-impelled into operative relation with the lower end of the thermostatic valve, and self-aligning means connecting the lever with said slidable element, whereby proper seating of the valve is insured at all times.

6. In a thermostatically controlled lever operated valve having a fixed and a movable part, means for associating the control lever with the movable part of the valve comprising a ring having diametrically opposed and extending knife edges on one face adapted to engage the movable part of the valve and diametrically opposed and extending knife edges on its opposite face adapted to engage the control lever, said knife edges on one face being staggered 90° with respect to those on the opposite face.

7. The structure specified in claim 6 with means for supporting the ring freely but in proper relation to the lever and movable valve part.

In testimony whereof I affix my signature.

HUBERT A. BARSCHOW.